(12) United States Patent
Falls et al.

(10) Patent No.: US 12,009,729 B1
(45) Date of Patent: Jun. 11, 2024

(54) MODULAR ELECTRIC MOTOR ASSEMBLY

(71) Applicant: Flyer Next, LLC, Los Angeles, CA (US)

(72) Inventors: Bruce Churchill Falls, Dove Canyon, CA (US); Scott Kochan, Los Angeles, CA (US); Oded Nechushtan, Los Angeles, CA (US)

(73) Assignee: Flyer Next, LLC, Los Angeles, CA (US)

( * ) Notice: Subject to any disclaimer, the term of this patent is extended or adjusted under 35 U.S.C. 154(b) by 0 days.

(21) Appl. No.: 18/451,745

(22) Filed: Aug. 17, 2023

(51) Int. Cl.
*H02K 7/116* (2006.01)
*H02K 5/20* (2006.01)
*H02K 9/19* (2006.01)
*H02K 11/33* (2016.01)
*B60K 1/00* (2006.01)

(52) U.S. Cl.
CPC ............ *H02K 7/116* (2013.01); *H02K 5/203* (2021.01); *H02K 9/19* (2013.01); *H02K 11/33* (2016.01); *B60K 1/00* (2013.01); *H02K 2211/03* (2013.01); *H02K 2213/06* (2013.01); *H02K 2213/12* (2013.01)

(58) Field of Classification Search
CPC ........ H02P 5/747; H02K 11/33; H02K 5/203; H02K 7/116; H02K 9/19; H02K 2211/03; H02K 2213/06; H02K 2213/12; H02K 9/00; H02K 9/02; H02K 9/04; H02K 9/06; H02K 9/08; H02K 9/14; H02K 9/16; H02K 9/18; B60K 1/00

USPC ..... 310/83, 99, 52, 54, 55, 57, 58, 59, 60 A, 310/64
See application file for complete search history.

(56) References Cited

U.S. PATENT DOCUMENTS

| | | | |
|---|---|---|---|
| 2013/0175953 A1* | 7/2013 | Astley | H02P 5/747 318/161 |
| 2020/0212755 A1* | 7/2020 | Okuhata | H02K 5/203 |
| 2021/0129664 A1* | 5/2021 | Mepham | B60K 17/046 |
| 2022/0074475 A1* | 3/2022 | Downs | F16H 37/0813 |
| 2022/0219520 A1* | 7/2022 | Wehlen | F16H 57/0441 |

OTHER PUBLICATIONS

Mike Jeffries; "How to Determine Your Motor's Actual Load"; Mader electric, inc.; Motors & Pump Repairs in Sarasota, FL; https://www.maderelectricinc.com/blog/how-to-determine-your-motors-actual-load; Jul. 10, 2017; 7 pages.
Allison Transmission Holdings Inc.; "Allison Transmission Expands eGen Power e-Axle Portfolio to Address Wide Range of Vehicle Applications and Markets"; Allison's eGen Power 100S to Serve Medium and Tandem-Axle Heavy-Duty Vehicles while 130D Serves Outside North America Markets; https://www.allisontransmission.com/en-gb/company/news-article/2021/09/01/allison-transmission-expands-egen-power-e-axle-portfolio-to-address-wide-range-of-vehicle-applications-and-markets; Indianapolis, Aug. 31, 2021; 2 pages.

* cited by examiner

*Primary Examiner* — Alexander A Singh
(74) *Attorney, Agent, or Firm* — Sterne, Kessler, Goldstein & Fox P.L.L.C.

(57) ABSTRACT

An electric motor assembly is disclosed. The electric motor assembly can include a plurality of electric motors coupled to a common gear assembly. Individual motors within the electric motor assembly can be dynamically controlled to increase motor efficiency at a given torque and RPM output.

20 Claims, 10 Drawing Sheets

700

702

Installing an electric motor assembly in an electric drive unit, the electric motor assembly including:
 a housing including a plurality of cavities;
 a gear assembly, including:
  an output gear coupled to an output shaft, and
  adjacent gears coupled to the output gear;
 a plurality of electric motors at least partially within the plurality of cavities, the plurality of electric motors including:
  a first electric motor coupled to the output gear, and
  adjacent electric motors coupled to the adjacent gears; and
 a controller to activate and deactivate one or a pair of motors of the plurality of electric motors.

FIG. 7

MODULAR ELECTRIC MOTOR ASSEMBLY

FIELD

Aspects relate to electric motors and implementations within an axle of an electric vehicle (EV).

BACKGROUND

The move towards clean energy is prompting interest, research, and development in the area of EVs, and specifically, systems used to propel EVs. Electric drive systems that can match or exceed the performance of internal combustion (IC) engines are critical to the success and adoption of EVs. EVs require electric drive systems that are energy efficient and can be produced and repaired in a cost efficient manner. In particular, the efficiency of electric drive systems is crucial for enabling EVs to travel for long distances without the need for the EVs' batteries to be recharged. Electric drive systems can implement electric motor assemblies to supply the torque and rotational frequency needs of EVs. Conventional electric motor assemblies typically consist of a single electric motor driving a gear set.

Conventional electric motor assemblies used in EVs suffer from several shortcomings. First, conventional electric motor assemblies are expensive to produce, implement, and repair. The peak power rating of electric motors used in EVs can exceed 400 kW, depending on the weight and use of the EV. Producing or purchasing electric motors of such size can be expensive. Additionally, electronic components compatible with large motors can be more rare and expensive compared to those compatible with smaller motors, leading to higher costs for implementing the electric motor within an EV. Further, if a component of the motor fails, the entire motor may need to be replaced. Even if the entire motor does not need to be replaced, the size of the motor may require handling by multiple technicians during repair.

Second, conventional electric motor assemblies have upper RPM operational limits based on the centrifugal forces that are applied to the rotor assemblies. The centrifugal force is directly related to the diameter and mass of the rotating assembly. This effectively limits the power-to-weight ratio because power is directly related to the operating RPM (output power=output torque x RPM). The upper operational speed can be increased by employing exotic materials but this comes at a cost.

Third, conventional electric motor assemblies do not have operational redundancy. Failure of the electric motor in a conventional electric motor assembly typically results in the loss of function of the entirety or large portions of the electric drive system, making the system inoperable.

Fourth, conventional electric motor assemblies often suffer from a significant difference between peak and continuous power rating. The power the electric motor can produce continuously is significantly less than the power the electric motor can produce instantaneously, due to overheating of the stator assembly (magnets) when the motor is run at peak power for an extended time.

Fifth, conventional electric motor assemblies are not versatile—the torque and power are locked in to the design. Thus, a conventional electric motor assembly that is built for one EV cannot be easily modified to work with other EVs without significant expense or reconfiguration. Further, a conventional electric motor assembly that is built for a particular use environment cannot be easily modified for optimal use in another environment posing different torque needs without significant expense or reconfiguration.

Sixth, conventional electric motor assemblies are not dynamically configurable (i.e., they cannot be adapted in real-time to be better suited to meet a particular torque demand). The electric motor in a conventional electric motor assembly is typically chosen to meet the maximum torque and power needs of a device (e.g., an EV) implementing the electric motor assembly. However, conventional electric motors operate at varying efficiencies depending on torque and RPM, with efficiency typically declining at torques that are a small percentage of a motor's continuous output torque (i.e., the torque the electric motor is capable of producing indefinitely without causing overheating, given a particular RPM). This is especially true at high RPM. The efficiency of a conventional electric motor assembly implementing a single electric motor will therefore vary significantly depending on the torque and RPM demand placed on the electric motor. Conventional electric motor assemblies do not have a means of configuring the electric motor assembly in real-time to more efficiently provide the torque/power need. Accordingly, EV's implementing conventional electric motor assemblies will run less than peak efficiency at many operating points which results in decreased range for a given battery capacity.

Thus, improved electric motor assemblies are needed to overcome one or more of the aforementioned shortcomings and to provide improved and more adaptable electric motor assemblies.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

FIG. 7 shows a diagram of a method according to aspects of the disclosure.

DETAILED DESCRIPTION

Figure 1:
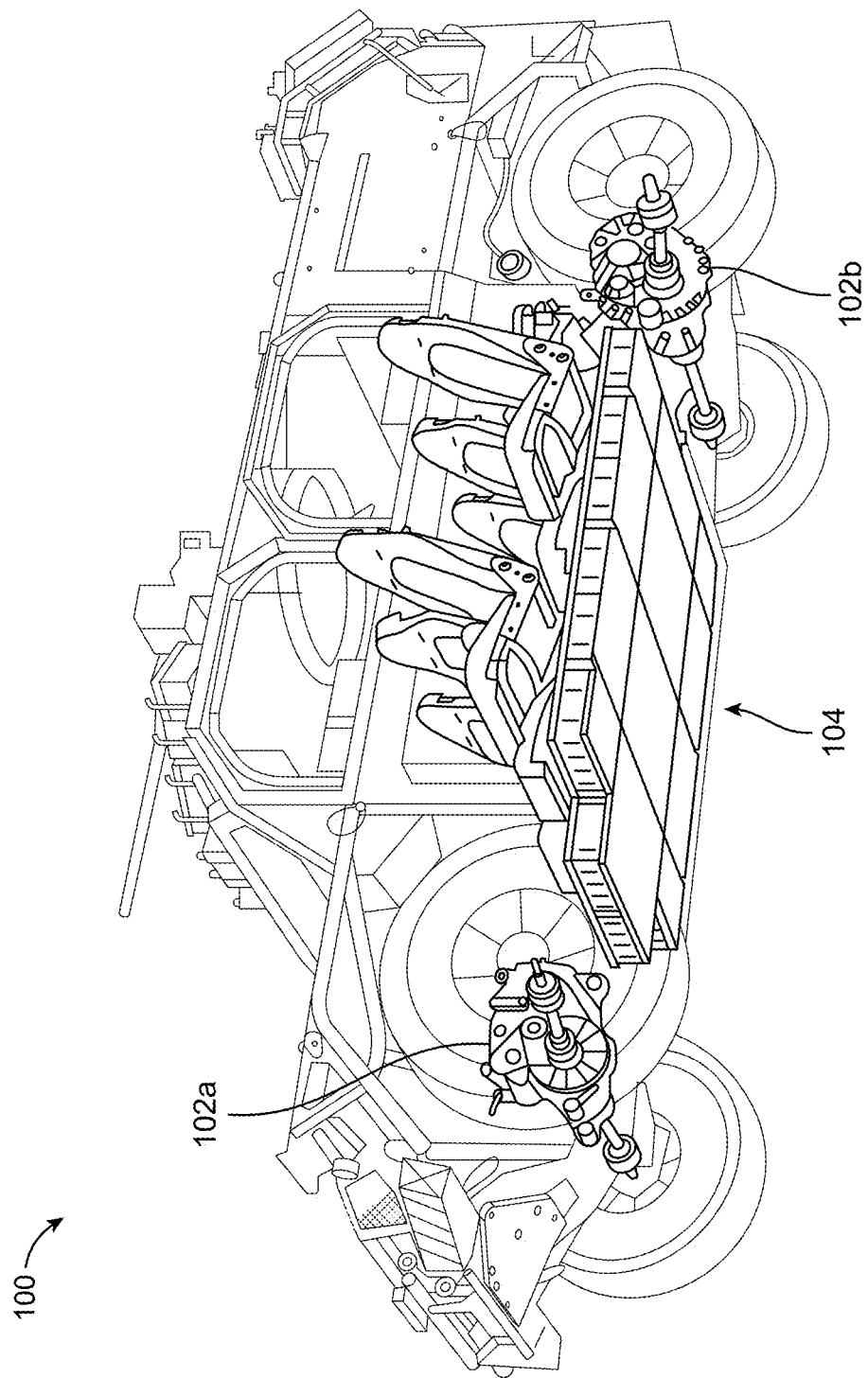
FIG. 1 shows an electric vehicle (EV) according to aspects of the disclosure.

Aspects disclosed herein provide a novel electric motor assembly. The electric motor assembly provides a novel construction over conventional electric motor assemblies, as will be described. This construction may provide several benefits.

First, it allows the electric motor assembly to potentially be less expensive to produce, implement, and repair. For example, the use of a plurality of smaller electric motors in place of a single, larger electric motor can allow for less expensive motors to be produced and/or purchased at higher volumes, reducing production and/or purchasing costs. Further, a wider variety of less expensive power electronic components are available for use with smaller electric motors, reducing costs of implementing electric motors within the electric motor assembly/electric drive system. If a motor within the assembly fails, it can be replaced at a cheaper cost. Additionally, the smaller size of the motors allows a single technician to handle and repair the motor assembly.

Second, the electric motor assembly can have higher power-to-weight ratios, due to the smaller size of the electric motors implemented within the electric motor assembly (see discussion above regarding operating RPM). The smaller diameters of the motor rotors used in the electric motor assembly can enable the electric motors to operate at higher RPM and generate more power for a given amount of magnetics (materials/mass) compared to a larger motor, while having approximately the same torque-to-weight ratio as the larger motor. Accordingly, a plurality of smaller motors can collectively provide the same power output as a single, larger motor while potentially weighing less than the larger motor.

Third, the electric motor assembly can have operational redundancy. Failure of a single electric motor of a plurality of electric motors does not necessarily result in the loss of function of the entire electric motor assembly, since the remaining electric motors of the plurality of electric motors can continue to operate. Thus, the operability of the electric drive system can be maintained through a motor failure.

Fourth, the difference between the peak and continuous power rating of the electric motor assembly can be smaller than for a conventional electric motor assembly. Given the same output power, a plurality of smaller electric motors produces less heat buildup than a single, larger electric motor. This is at least because the plurality of electric motors has a larger surface area, allowing for quicker dissipation of heat into surrounding materials (e.g., a housing, air, etc.).

Fifth, the electric motor assembly can be versatile. The use of a plurality of smaller electric motors in place of a single, larger electric motor can provide a single component that can be used in multiple EVs or types of EVs. For example, one or more of the plurality of electric motors can be removed based on the torque needs of the type of EV (e.g., an electric motorcycle can implement an electric motor assembly with fewer motors installed than an electric truck). Further, one or more of the plurality of electric motors can be removed based on the torque needs associated with a use environment (e.g., an electric car that operates primarily in a mountainous area can implement an electric motor assembly with more motors installed than an electric car that operates primarily in a flat region). The electric motor assembly can be easily reconfigured depending on the type and/or use environment of an EV since the electric motor assembly is designed to accommodate the attachment, detachment, and omission of individual electric motors.

Sixth, the electric motor assembly can be dynamically configurable (i.e., it can be adapted in real-time to be better suited to meet a particular torque demand). Conventional electric motors operate at varying efficiencies depending on torque and RPM, with efficiency typically declining at torques that are a small percentage of the motor's continuous output torque, particularly at high RPM. Accordingly, in an electric motor assembly in which a plurality of smaller motors replace a single, larger motor, the continuous and peak output torque of the electric motor assembly at a given RPM can be adjusted by selectively activating or deactivating one or more motors. Therefore, the electric motor assembly's output torque as a percentage of the continuous output torque of its activated motors can be dynamically adjusted to ensure that the output torque is achieved at a higher efficiency. Additionally, since smaller motors can produce higher RPM more efficiently, as noted above, the efficiency of the motor assembly at low loads and high RPM can be improved. Operation at low loads and high RPM is an inefficient operating domain for an electric motor assembly implementing a single, large motor.

In aspects, an electric motor assembly can include at least: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors.

In aspects, an electric drive system can include at least: an electric motor assembly, the electric motor assembly including: a gear assembly including an output gear and one or more gears coupled to the output gear, the output gear being coupled to an output shaft, and a plurality of electric motors, each of the plurality of electric motors coupled to a gear of the gear assembly; the electric drive system further including: a control system to activate and deactivate one or more motors of the plurality of electric motors; an energy storage system coupled to the electric motor assembly; and a power demand system to communicate a torque need to the control system to activate or deactivate the one or more motors.

In aspects, a method can include at least: installing an electric motor assembly in an electric drive unit, the electric motor assembly including: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors.

In aspects, a vehicle can include at least: an electric motor assembly, the electric motor assembly including: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of the disclosure. However, it will be apparent that the disclosure may be practiced without these specific details. In order to avoid obscuring aspects of the present disclosure, some configurations and process steps are not disclosed in detail.

The drawings showing aspects of the system and its components are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

FIG. 1 shows a vehicle 100 according to aspects of the disclosure. Vehicle 100 can be an EV (i.e., vehicle 100 can be propelled using at least one electric motor). While FIG. 1 shows vehicle 100 as an electric car, vehicle 100 can be any electric vehicle, such as a truck, an airplane, a boat, a 4-wheeler, a motorcycle, etc. As shown in FIG. 1, vehicle 100 can include a drive unit 102 to propel vehicle 100, such as first drive unit 102a and second drive unit 102b. In aspects, first and second drive units 102a/b can be electric axles (eAxles). In aspects in which vehicle 100 is a car, first drive unit 102a can be disposed toward the front of vehicle 100 and second drive unit 102b can be disposed toward the rear of the vehicle 100. In such aspects, vehicle 100 can also alternatively include a single drive unit 102 disposed toward either the front or rear of vehicle 100, or additional drive units 102. In other aspects, vehicle 100 can include any number of drive units 102 to propel vehicle 100.

Vehicle 100 can further include energy storage system 104 to supply power to drive units 102. Accordingly, energy storage system 104 can be coupled to drive units 102. In aspects, energy storage system can include a battery or collection of batteries.

Figure 2A:
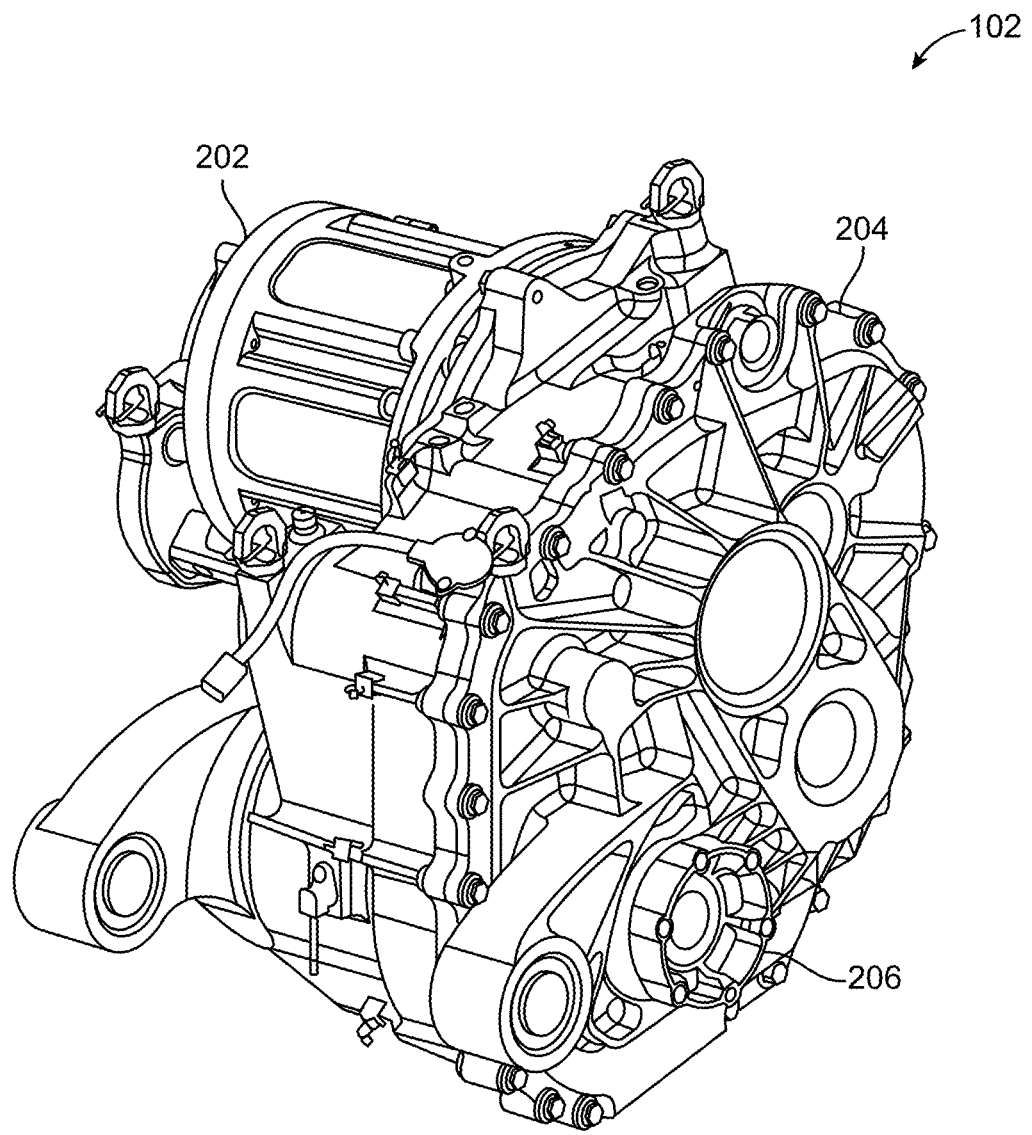
FIG. 2A shows a perspective view of an electric drive unit according to aspects of the disclosure.

FIG. 2A shows a drive unit 102 according to aspects of the disclosure. Drive unit 102 can be an electric drive unit (i.e., drive unit 102 can include an electric motor used to provide a torque for a device). More specifically, drive unit 102 can be an eAxle. As shown in FIG. 2A, drive unit 102 can include a motor assembly 202, an example of which is described in more detail with respect to FIGS. 3A-3B. Drive unit 102 can further include a housing 204 to house the components of drive unit 102. Drive unit 102 can further include a shaft 206 to output a torque produced by motor assembly 102. While not shown in FIG. 2A, drive unit 102 can include at least one inverter to control the operation of motor assembly 202 by manipulating electric currents provided to motor assembly 202. For example, the inverter can convert a current from direct current (DC) to alternating current (AC) and adjust the frequency of the alternating current to control the output speed of motor assembly 202.

Figure 2B:
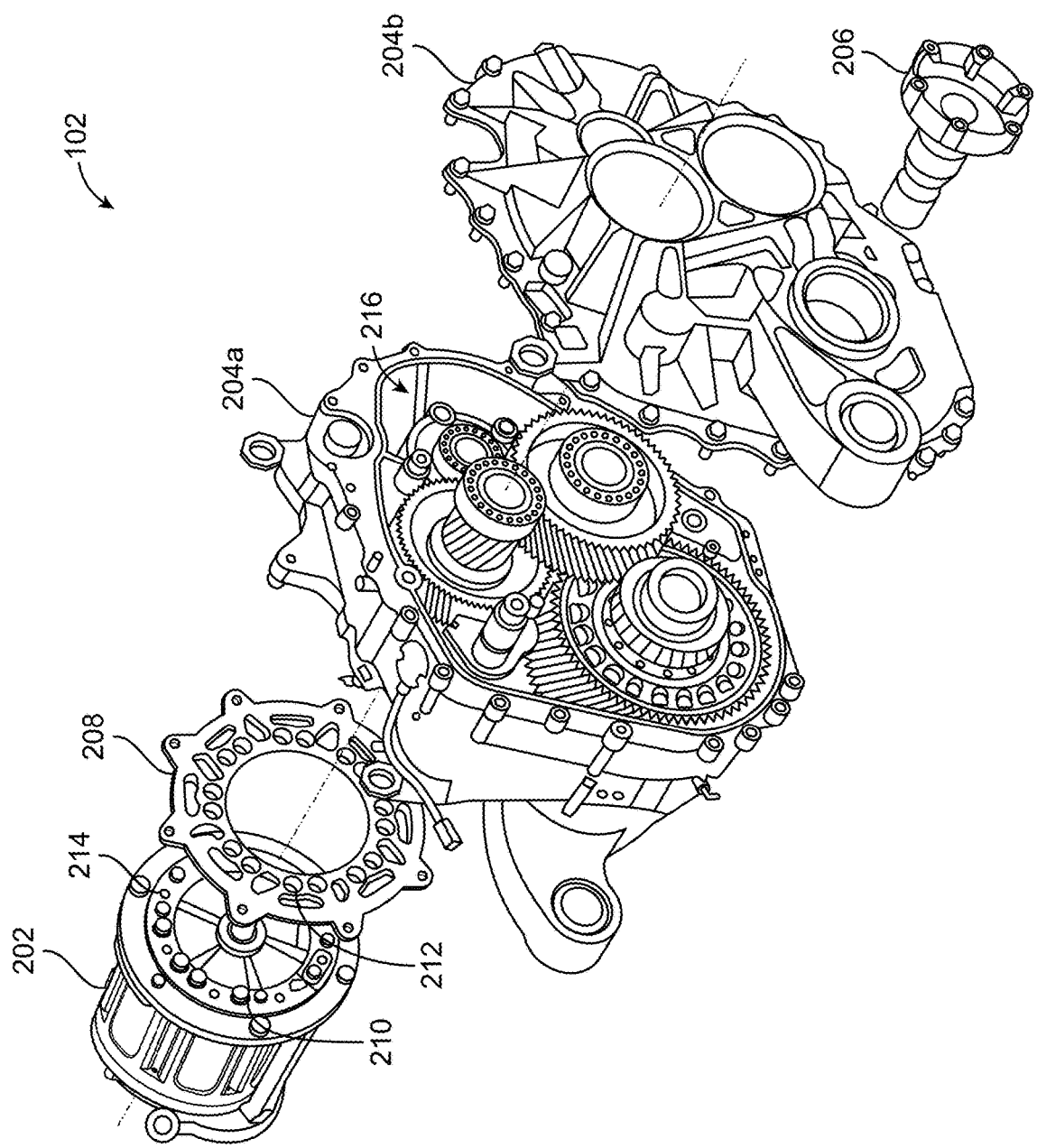
FIG. 2B shows an exploded perspective view of the electric drive unit shown in FIG. 2A according to aspects of the disclosure.

FIG. 2B shows an exploded view of electric drive unit 102 according to aspects of the disclosure. As shown in FIG. 2B, motor assembly 202 can be attachable to and detachable from housing 204 (shown as a first housing 204a and a second housing 204b in FIG. 2B). Motor assembly 202 can be attached to housing 204 using attachment element 208. Attachment element 208 can be a fixture configured to attach to both motor assembly 202 and housing 204. Motor assembly 202 can include alignment elements 210 that can be received by alignment apertures 212 on attachment element 208. Further, motor assembly 202 can include affixment apertures 214 to receive bolts or screws used to secure attachment element 208 to motor assembly 202. Attachment element 208 can then be secured to housing 204 using similar means.

Drive unit 102 can further include a gear assembly 216 to receive and control a torque produced by motor assembly 202. Gear assembly 216 can transfer a torque from motor assembly 202 to shaft 206, altering gear ratios within gear assembly 216 to control the torque and rotational frequency supplied to shaft 206. In aspects, gear assembly 216 can be a two-speed gear assembly. In other aspects, gear assembly 216 can be a single speed gear assembly.

While FIGS. 2A-2B show motor assembly 202 in a drive unit 102 for use in an EV, motor assembly 202 can be used in any device requiring the production of a torque. Further, motor assembly 202 can be interchangeable with a conventional motor assembly (i.e., a conventional motor assembly can be attached to drive unit 102 in place of motor assembly 202). However, unlike conventional motor assemblies, motor assembly 202 can include multiple motors, as discussed with respect to FIGS. 3A-3B.

Figure 3A:
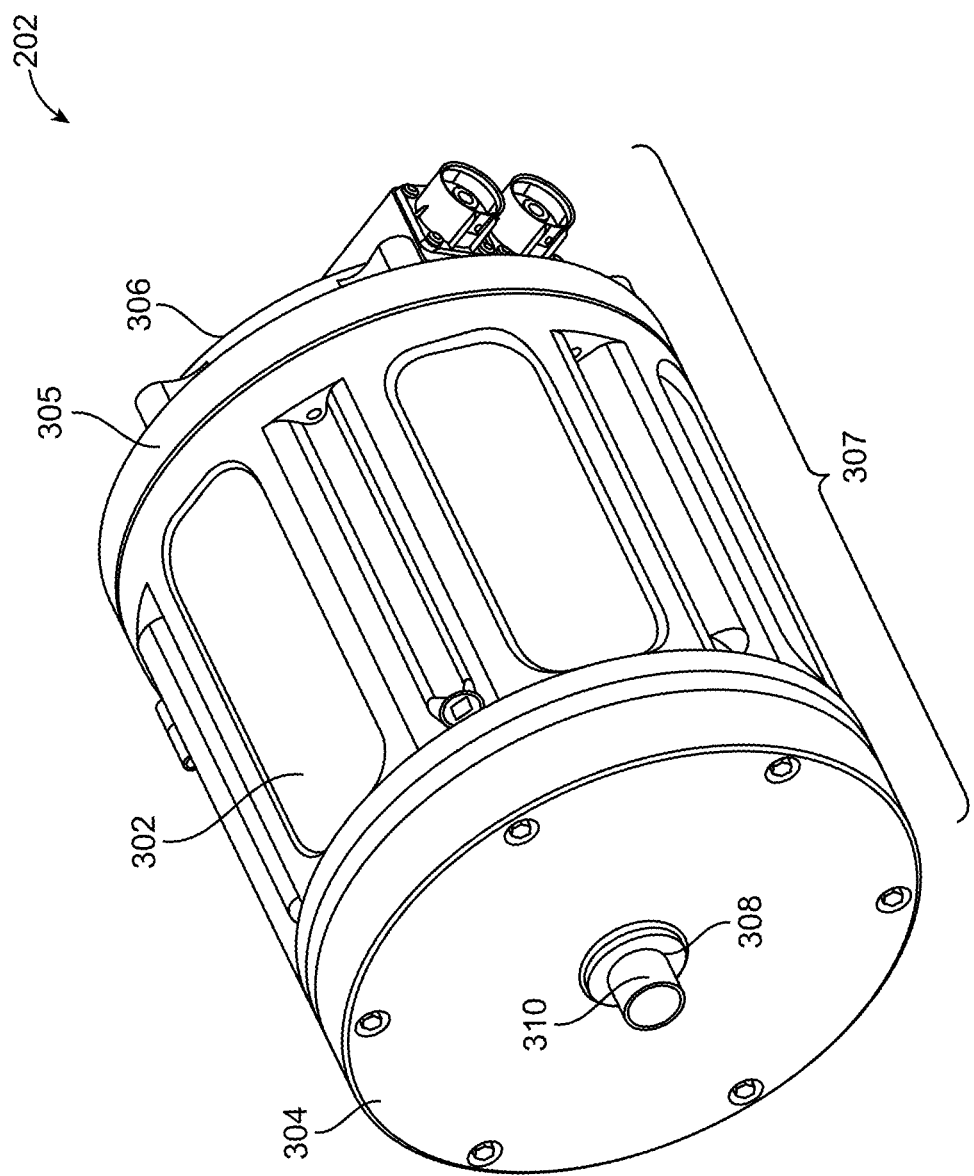
FIG. 3A shows a perspective view of an electric motor assembly according to aspects of the disclosure.

FIG. 3A shows a motor assembly 202 according to aspects of the disclosure. As shown in FIG. 3A, motor assembly 202 can include a main housing 302, a first end cap 304, a layer 305, and a second end cap 306 to house motors within motor assembly. Main housing 302, first end cap 304, layer 305, and second end cap 306 can collectively form a housing 307. First end cap 304 can include an aperture 308 allowing an output shaft 310 to pass therethrough. Output shaft 310 can transfer a torque to external gear assemblies, such as gear assembly 216 shown in FIG. 2B.

Figure 3B:
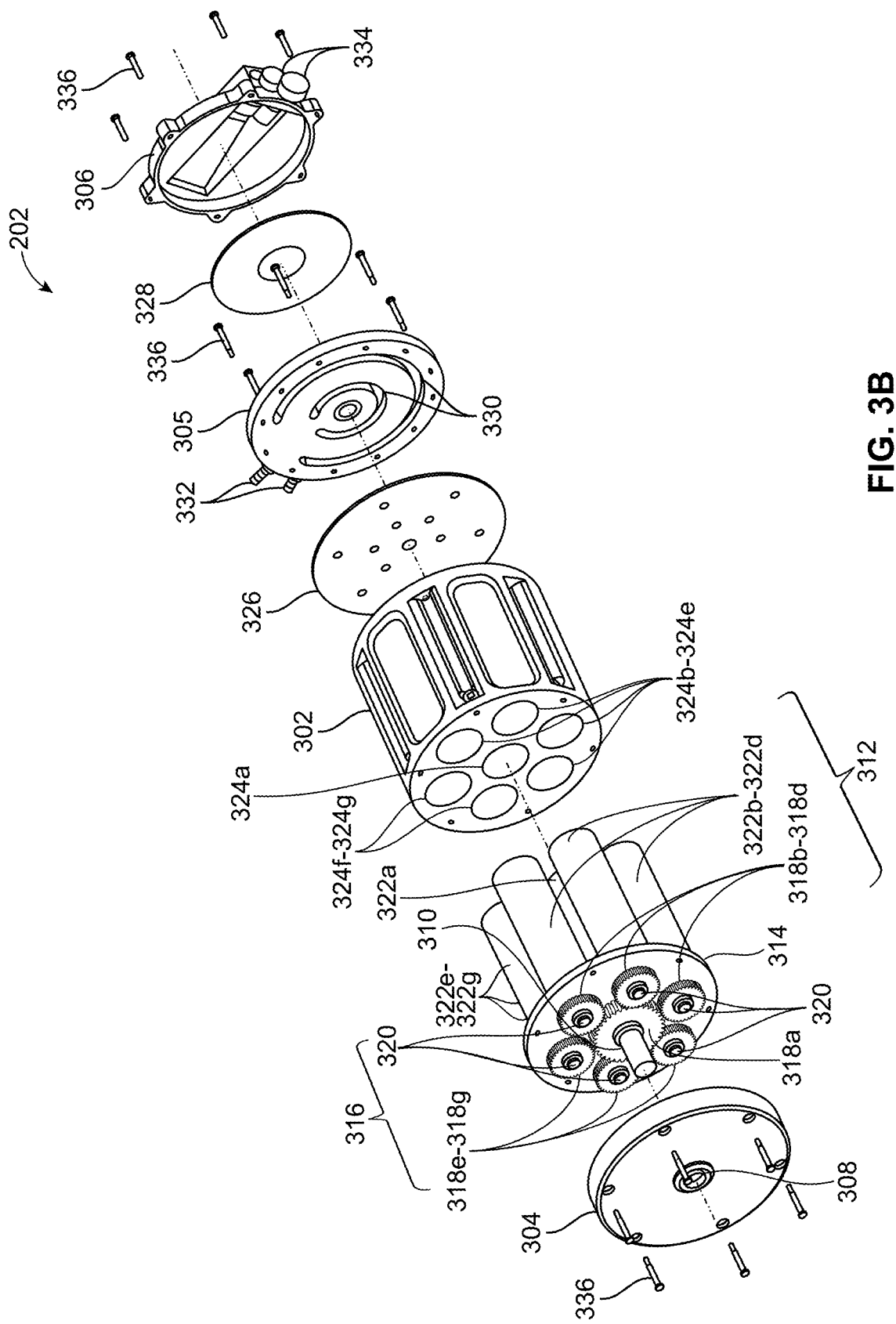
FIG. 3B shows an exploded perspective view of the electric motor assembly shown in FIG. 3A according to aspects of the disclosure.
Figure 3C:
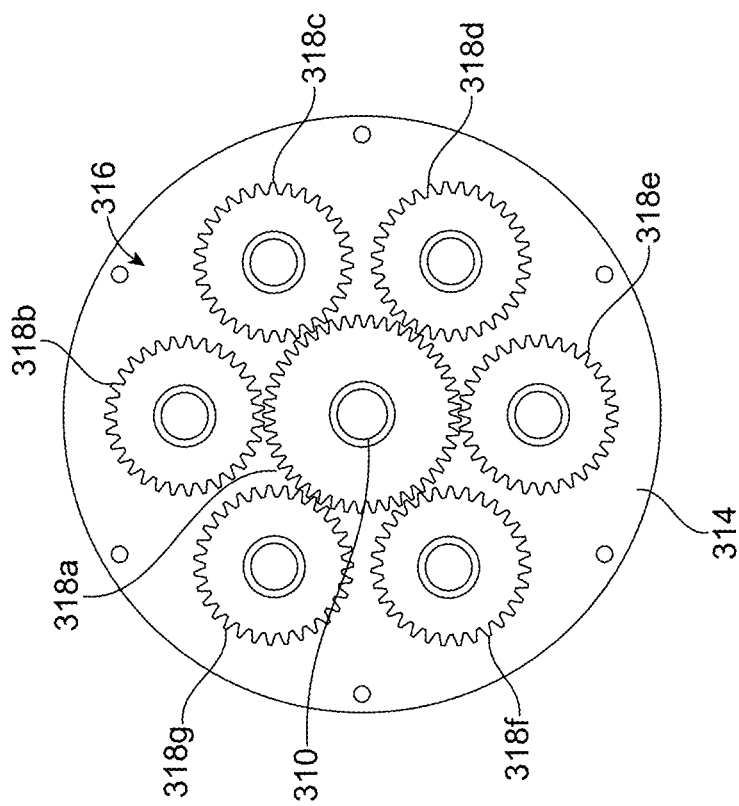
FIG. 3C shows a gear assembly according to aspects of the disclosure.

FIG. 3B shows an exploded view of motor assembly 202 according to aspects of the disclosure. As shown in FIG. 3B, motor assembly 202 can include a drive assembly 312 to generate a torque. Drive assembly 312 can include a support plate 314 to which components of drive assembly 312 can be attached. For example, a gear assembly 316 can be attached to support plate 314.

Gear assembly 316 can include gears 318. FIG. 3B shows seven gears 318a-318g. Gear 318a of gear assembly 316 can be an output gear coupled to output shaft 310. Gears 318b-318g can be adjacent gears coupled to gear 318a (gears 318b-318g are sequentially labeled in a clockwise direction starting with gear 318b at the top of gear assembly 316). That gears 318b-318g are adjacent can mean that gears 318b-318g are in a common gear assembly with gear 318a. Further, that gears 318b-318g are adjacent can include cases in which gears 318b-318g are both directly or indirectly coupled to gear 318a. In aspects, gears 318b-318g can be directly coupled to gear 318a, for example, by each of gears 318b-318g being in contact and enmeshed with gear 318a. In other aspects, at least one of gears 318b-318g can be indirectly coupled to gear 318a, for example, by being coupled to gear 318a without being in contact or enmeshed with gear 318a. In this sense, that gears are "coupled" to gear 318a can mean that rotation of one of gears 318b-318g contributes to rotation of gear 318a, either directly or via another gear. To avoid mechanical breakdown, if one of gears 318b-318g is directly coupled to gear 318a, it cannot be directly coupled to another of gears 318b-318g that is in turn directly coupled to gear 318a (e.g., gear 318b cannot be directly coupled to gear 318c in FIG. 3B).

In aspects, gear 318a can be a central gear (i.e., arranged between at least two of gears 318b-318g). In such aspects, at least two of gears 318b-318g can be peripheral gears arranged around gear 318a.

While FIG. 3B shows six gears 318b-318g coupled to gear 318a, this is exemplary and gear assembly 316 can include fewer or additional adjacent gears, such as 1, n adjacent gears, where n is a positive integer. Further, the number of adjacent gears can be an even number. Particularly, the adjacent gears can be pairs of gears, each gear of a pair of gears arranged on opposite sides of gear 318a, for example, like gear 318b and gear 318e in FIG. 3B. The reference to gears 318b-318g in this disclosure should be understood to include aspects in which there are fewer or more than six adjacent gears.

Gears 318 can form any suitable gear ratios for providing the output torques required of motor assembly 202. In aspects, gears 318b-318g can each form the same gear ratio with gear 318a. For example, in aspects, gears 318b-318g can each form a gear ratio of approximately 1:1 with gear 318a. In other aspects, gears 318b-318g can form varying gear ratios with gear 318a.

Drive system 312 can further include motors 322, such as motors 322a-322g, to rotate gears 318a-318g. FIG. 3B shows seven motors 322a-322g corresponding to gears 318a-318g. In aspects, motors 322 can be AC electric motors. For example, in aspects, motors 322 can be three-phase induction AC electric motors. In other aspects, motors 322 can be three-phase synchronous AC electric motors. Motor 322a can be coupled to gear 318a via output shaft 310. Motors 322b-322g can be adjacent motors coupled to gears 318b-318g via shafts 320 (motors 322b-322g are sequentially labeled in a clockwise direction starting with motor 322b corresponding to gear 318b). That motors 322b-322g are adjacent can mean that motors 322b-322g are coupled via shafts 320 to gears that are in a common gear assembly with gear 318a. In aspects, motor 322a can be a central motor (i.e., arranged between at least two of motors 322b-322g). In such aspects, at least two of motors 322b-322g can be peripheral motors arranged around motor 322a. Motors 322b-322g can turn each of gears 318b-318g in a direction that contributes to the turning of gear 318a in a particular direction. For example, in aspects in which gears 318b-318g are each directly coupled to gear 318a, motors 322b-322g can turn gears 318b-318g in one direction (e.g., clockwise) while motor 322a can turn gear 318a in the opposite direction (e.g., counterclockwise).

While FIG. 3B shows six motors 322b-322g coupled to six gears 318b-318g that are in turn coupled to gear 318a, this is exemplary and drive assembly 312 can include fewer or additional adjacent motors, such as 1, n adjacent motors, where n is a positive integer. Further, the number of adjacent motors can be an even number. Particularly, the adjacent motors can be pairs of motors, each motor of a pair of motors arranged on opposite sides of motor 322a, for example, like motor 322d and motor 322g. The inclusion of multiple motors 322b-322g can increase operational redundancy of motor assembly 202. For example, upon failure of a portion of motors 322, operability of motor assembly 202 can be maintained. The reference to motors 322b-322g in this disclosure should be understood to include aspects in which there are fewer or more than six adjacent motors. In aspects, a motor 322 can be coupled to each of gears 318, as shown in FIG. 3B. In other aspects, drive assembly 312 can include a larger number of gears 318 than motors 322.

Motors 322 can be conventional electric motors. For example, motors 322 can each include a stator and a rotor contained within a housing. Additionally, in aspects, the housing of a motor can include at least one coolant channel for a non-direct or direct contact cooling fluid, e.g., a dielectric oil, to flow. Each motor 322 including a cooling system can increase the continuous power rating of motor assembly 202. Additionally or alternatively, housing 307 can include a cooling system for all of motors 322, as described below.

While the principles of the present disclosure are discussed with regard to motors 322 that can be used in an electric vehicle, the principles of the present disclosure can be apply to motors 322 having any specifications. For example, the principles of the present disclosure can apply to motors 322 having any continuous power rating, peak power rating, continuous torque rating, and peak torque rating.

In aspects, motors 322 can be substantially similar. For example, in aspects, motors 322 can have substantially the same continuous power rating, peak power rating, continuous torque rating, and peak torque rating. In other aspects, the specifications of motors 322 can vary among motors 322. For example, in such aspects, motors 322b-322g can have substantially the same continuous power rating, peak power rating, continuous torque rating, and peak torque rating while motor 322a can have a different power rating, peak power rating, continuous torque rating, and/or peak torque rating. In aspects, it may be advantageous to separately configure motor 322a to have different specifications from motors 322b-322g, as motor 322a can operate alone at low torque needs. Additionally, in such aspects, at least two of motors 322b-322g can have different continuous power ratings, peak power ratings, continuous torque ratings, and/or peak torque ratings while motor 322a can have a different or the same power rating, peak power rating, continuous torque rating, and/or peak torque rating as at least one of motors 322b-322g. In aspects in which the specifications of motors can 322 vary among motors 322, the gear ratios of each of gears 318b-318g with gear 318a can be selected based on the specifications of each of motors 322 to optimize the torque and RPM output of motor assembly 202. Further, in such aspects, one or more motors 322 can be activated or deactivated based on a torque need and individual specifications of motors 322 (i.e., to optimize the efficiency of motor assembly 202 at a given torque and RPM output). For example, motors 322 having various continuous torque ratings can provide a means of more precisely adjusting the continuous torque output of an activated combination of motors of motor assembly 202 at a given RPM. This can provide increased control over the percentage of the continuous output torque a required output torque comprises at a given RPM, which can enable motor assembly 202 to more precisely target percentages that correspond to maximum efficiencies.

As shown in FIG. 3B, main housing 302 can include cavities 324, such as cavities 324a-324g, to receive motors 322a-322g. FIG. 3B shows seven cavities 324a-324g corresponding to motors 322a-322g. Cavity 324a can receive motor 322a coupled to gear 318a. Cavities 324b-324g can be adjacent cavities that receive motors 322b-322g (cavities 324b-324g are sequentially labeled in a clockwise direction starting with cavity 324b corresponding to motor 322b). That cavities 324b-324g are adjacent can mean that cavities 324b-324g receive motors that are coupled via shafts 320 to gears that are in a common gear assembly with gear 318a. In aspects, cavity 324a can be a central cavity (i.e., arranged between at least two of cavities 324b-324g). In such aspects, at least two of cavities 324b-324g can be peripheral cavities arranged around cavity 324a.

While FIG. 3B shows six cavities 324b-324g receiving six motors 322b-322g, this is exemplary and main housing 302 can include fewer or additional adjacent cavities, such as 1, n adjacent cavities, where n is a positive integer. Further, the number of adjacent cavities can be an even number. Particularly, the adjacent cavities can be pairs of cavities, each cavity of a pair of cavities arranged on opposite sides of cavity 324a, for example, like cavity 324b and cavity 324e. The reference to cavities 324b-324g in this disclosure should be understood to include aspects in which there are fewer or more than six adjacent cavities. In aspects, main housing 302 can include a cavity 324 for each motor 322 (i.e., the same number of cavities 324 as motors 322 within motor assembly 202). In other aspects, main housing 302 can include a larger number of cavities 324 than the number of motors 322 included in motor assembly 202. In aspects, cavities 324 can be substantially the same size. In other aspects, cavities 324 can be sized differently, for example, to accommodate different sized motors 322.

A motor 322 inserted into a cavity 324 can be at least partially within the cavity 324. For example, only a part or none of the motor 322 can be visible when the motor is inserted into the cavity 342. Accordingly, motors 322a-322g can be at least partially within cavities 324a-324g when motor assembly 202 is assembled. In aspects, main housing 302 including cavities 324 can form a unitary structure for receiving motors 322. While FIG. 3B shows main housing 302 having a circular cross section, the cross section main housing 302 can be ovular or polygonal, such as rectangular, hexagonal, octagonal, etc., without interfering with the function of motor assembly 202.

As shown in FIG. 3B, motor assembly 202 can further include a first printed circuit board (PCB) 326. First PCB 326 can include controllers for driving motors 322, as described in more detail below. For example, first PCB 326 can include at least one inverter for controlling motors 322. In aspects, first PCB 326 can include an inverter connected to each of motors 322. First PCB 326 can be positioned between main housing 302 and layer 305 such that it abuts motors 322. Controllers on first PCB 326 can connect to terminals on motors 322. In aspects, motor assembly 202 can include a second PCB 328 including additional components, such as circuitry for receiving and supplying power to motors 322 from connectors 334, described below. In aspects, second PCB 328 can be positioned between layer 305 and second end cap 306. In other aspects, first PCB 326 and second PCB 328 can be combined and can be positioned between main housing 302 and layer 305.

As shown in FIG. 3B, layer 305 can include channels 330. Channels 330 can be cooling channels configured to circulate a cooling fluid. In aspects, the cooling fluid can be a dielectric fluid, for example, a dielectric oil. The cooling fluid can enter and exit channels 330 through nozzles 332. The cooling fluid can contact first PCB 326 and/or second PCB 328 and motors 322 to cool components disposed on first PCB 326 and/or second PCB 328 and components disposed within motors 322. First PCB 326 and/or second PCB 328 being positioned between layer 305/channels 330 and motors 322 can secure the benefit of a single cooling feature (e.g., channels 330 for transporting cooling fluid) being used to cool various electronic components within motor assembly 202.

Additionally, the inclusion of multiple motors 322 within motor assembly 202 can improve the efficiency of motor assembly 202's cooling features. For example, as compared to a single large motor, multiple smaller motors 322 can provide greater access (for cooling) to components within the multiple smaller motors 322 that generate heat (e.g., the rotors and stators), since the components of a smaller motor can be nearer to exterior surfaces of a housing of the smaller motor. Therefore, a cooling fluid (e.g., dielectric oil) can flow nearer to heat generating components and better absorb and transfer heat out of motor assembly 202.

As shown in FIG. 3B, second end cap 306 can include connectors 334. Connectors 334 can communicatively couple motor assembly 202 to various components or systems within vehicle 100, for example, energy storage system 104 and/or a power demand system as described below.

First end cap 304 can be detachable from support plate 314 and/or main housing 302. Support plate 314 can be detachable from main housing 302. First PCB 326, layer 305, second PCB 328, and second end cap 306 can be detachable from main housing 302 and one another. Each of these components can be detached by removing fasteners 336, as shown in FIG. 3B. Accordingly, motor assembly 202 can be easily disassembled to gain access to drive system 312 for the configuration and/or repair of drive system 312. For example, motors 322 can each be detachable from its corresponding gear 318 and from support plate 314. Individual motors 322 can be easily removed and serviced or replaced. Further, individual gears 318 can be easily removed and serviced or replaced.

The size and weight of each of motors 322 can allow a single technician to handle and repair motor assembly 202. For example, in aspects, one of motors 322 can be removed and inspected by a single technician, as it can weigh about 8-12 kg. In comparison, an electric motor with a peak power rating of about 400 kW for use in an EV can weigh 50 kg or more. A technician can open motor assembly 202, remove a gear 318 from a motor 322, detach the motor 322 from support plate 314, and repair or replace the motor 322. Alternatively, the technician can remove or add motors 322 to configure motor assembly 202 to operate in a particular environment (e.g., a flat region requiring less torque and fewer motors 322 within motor assembly 202).

Figure 4:
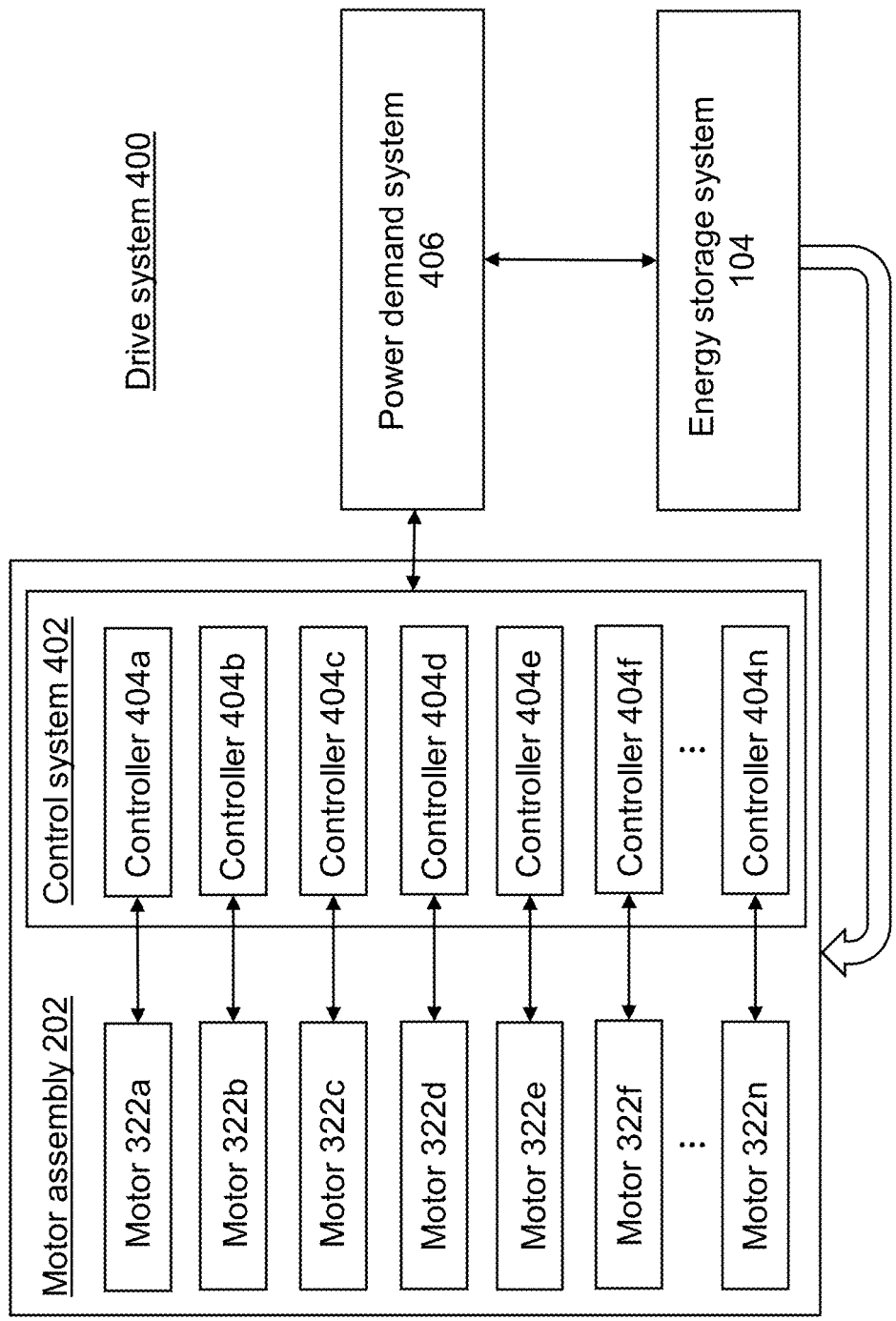
FIG. 4 shows a diagram of a drive system according to aspects of the disclosure.

FIG. 4 shows a diagram of a drive system 400 according to aspects of the disclosure. Drive system 400 can include energy storage system 104, motor assembly 202, a control system 402, and a power demand system 406. Power demand system 406 can be integrated within a device implementing motor assembly 202, such as vehicle 100. Power demand system 406 can determine a torque need to be requested from motor assembly 202. The torque need can be based on a particular speed, or RPM, a user of an EV is desiring to produce at a given resistance (i.e., a particular RPM output can result from a particular torque output applied to a given resistance). In an EV, the torque need can be based on a user operation of the EV, which can in turn be based on an environment in which the EV is operating. For example, when the EV is operating on a hill, a user may apply more force to an accelerator of the EV to maintain the constant speed of the EV while traveling up the hill. Power demand system 406 can determine, based on the user's action, that an increased torque must be requested from motor assembly 202. In a self-driving system, power demand system 406 can determine the torque need based on monitoring features of the environment (e.g., forces acting on the vehicle, speed limit signs, the radius of a turn in the road, etc.). Once power demand system 406 has determined the torque need, power demand system 406 can communicate the torque need to control system 402, which can request motor assembly 202 produce the torque need as an output torque. Power demand system 406 can communicate the torque need to control system 402 at any interval to communicate changes in the torque need. Energy storage system 104 can provide power to motor assembly 202 to meet the torque need communicated to control system 402 by power demand system 406.

In aspects, control system 402 can be bodily integrated with motor assembly 202, for example, by being integrated into first PCB 326 and/or second PCB 328. In other aspects, control system 402 can be distinct from but communicatively coupled to motor assembly 202, or can be partially bodily integrated with motor assembly 202 and partially distinct from but communicatively coupled to motor assembly 202. Control system 402 can receive the torque need from power demand system 406 and instruct motor assembly 202 to produce the torque need as an output torque.

Based on the torque need, control system 402 can selectively activate or deactivate one or more motors 322 within motor assembly 202. For example, control system 402 can activate one or motors 322 if the torque need increases, and deactivate one or more motors 322 if the torque need decreases. As shown in FIG. 4, motor assembly can include any number of motors up to motor 322n. In aspects, control system 402 can selectively activate, deactivate, and control motors 322 individually. In aspects, control system 402 can selectively activate, deactivate, and control motors 322 in pairs. For example, based on power demand system 406 determining that motor assembly 202 is required to output a decreased torque, control system 402 can deactivate pairs of motors that are arranged on opposite sides of motor 322a, such as motors 322b and 322e shown in FIG. 3B. Activating or deactivating motors in opposing pairs can maintain mechanical balance within motor assembly 202 during operation.

In aspects, activated pairs of motors 322 can be rotated among motors 322 based on motor usage (e.g., total input or output power). For example, in aspects, control system 402 can be configured to track usage of each of motors 322 such that a pairs of motors 322 can deactivated and another pair of motors 322 can be activated based on motor usage. This method can be utilized even if motors 322 are not activated or deactivated in pairs. In this way, control system 402 can maintain approximate equivalency of usage among motors 322. Accordingly, the lifetime of motors 322 can be extended and the frequency of servicing motor assembly 202 to address failure of over-utilized motors can be reduced.

In aspects, control system 402 can activate or deactivate one or more motors 322 to reach a maximally efficient number of motors 322 for outputting the torque need. For example, the maximally efficient number of motors 322 can be a number of motors that causes the torque need to comprise a percentage of the continuous output torque (of the number of active motors 322 collectively) that corresponds to a maximum possible operating efficiency for motor assembly 202. The determination of operating efficiency for specific torque and RPM outputs of an electric motor is discussed below in more detail with respect to FIG. 6.

In aspects, the maximally efficient number of motors 322 can be calculated by control system 402 based on at least one of a continuous power rating, peak power rating, continuous torque rating, peak torque rating, or service factor of each of motors 322 (e.g., by comparing the torque need to a cumulative continuous or peak torque rating of various numbers of motors 322 and selecting the number that most efficiently produces the torque need). For example, in aspects, the maximally efficient number of motors 322 can be a number of motors 322 that causes the torque need to be between about 60 percent and about 100 percent of the cumulative continuous torque rating of the number of motors 322.

Additionally or alternatively, the maximally efficient number of motors 322 can be calculated by control system 402 based on data on at least one of continuous output torque or peak output torque of motors 322 at a given RPM at which motor assembly 202 is operating (e.g., by comparing the torque need to a cumulative continuous or peak output torque of various numbers of motors 322 and selecting the number that most efficiently produces the torque need, accounting for the variation in continuous output torque caused by changes in RPM output). For example, in aspects, the maximally efficient number of motors 322 can be a number of motors 322 that causes the torque need to be between about 60 percent and about 100 percent of the cumulative continuous output torque of the number of motors 322 at the current RPM output.

Additionally or alternatively, the maximally efficient number of motors 322 can be calculated by control system 402 based on a temperature of individual motors 322 within motor assembly 202 (e.g., the maximally efficient number of motors can be increased if the temperature of a motor 322 rises above a threshold level).

In aspects, the maximally efficient number of motors 322 can be the minimum number of motors 322 required to continuously output the torque need. As noted above, in aspects, this number can depend on RPM output.

In aspects, calculating the maximally efficient number of motors 322 can include calculating a maximally efficient number of pairs of motors 322, such that activating the maximally efficient number of motors 322 does not cause mechanical imbalance by activating an unpaired motor 322.

With reference to FIG. 3B, control system 402 can drive each of motors 322a-322g in a direction that contributes to the turning of gear 318a in a particular direction. For example, in aspects in which gears 318b-318g are each directly coupled to gear 318a, control system 402 can drive each of motors 322b-322g in an opposite direction to motor 322a. For example, control system 402 can drive motors 322b-322g clockwise while driving motor 322a counter-clockwise, or vice-versa.

Control system 402 can communicate with motors 322 via controllers 404, such as controllers 404a-404n. In aspects, controllers 404 can be 3-phase motor controllers. In aspects, controllers 404 can each include an inverter. In aspects, controllers can be variable-frequency drive (VFD) controllers. Accordingly, controllers 404 can control motors 322 via field-oriented control (FOC). In other aspects, controllers 404 can control motors 322 via direct torque control (DTC) or V/Hz control. In aspects, controllers 404 can be bodily integrated with motors 322. In other aspects, controllers 404 can be distinct from but communicatively coupled to motors 322, for example, by being integrated within first PCB 326 and/or second PCB 328. As shown in FIG. 4, control system 400 can include a controller 404 per motor 322. Controllers 404 can activate, deactivate, and control individual motors of motors 322 based on the torque need.

Figure 5:
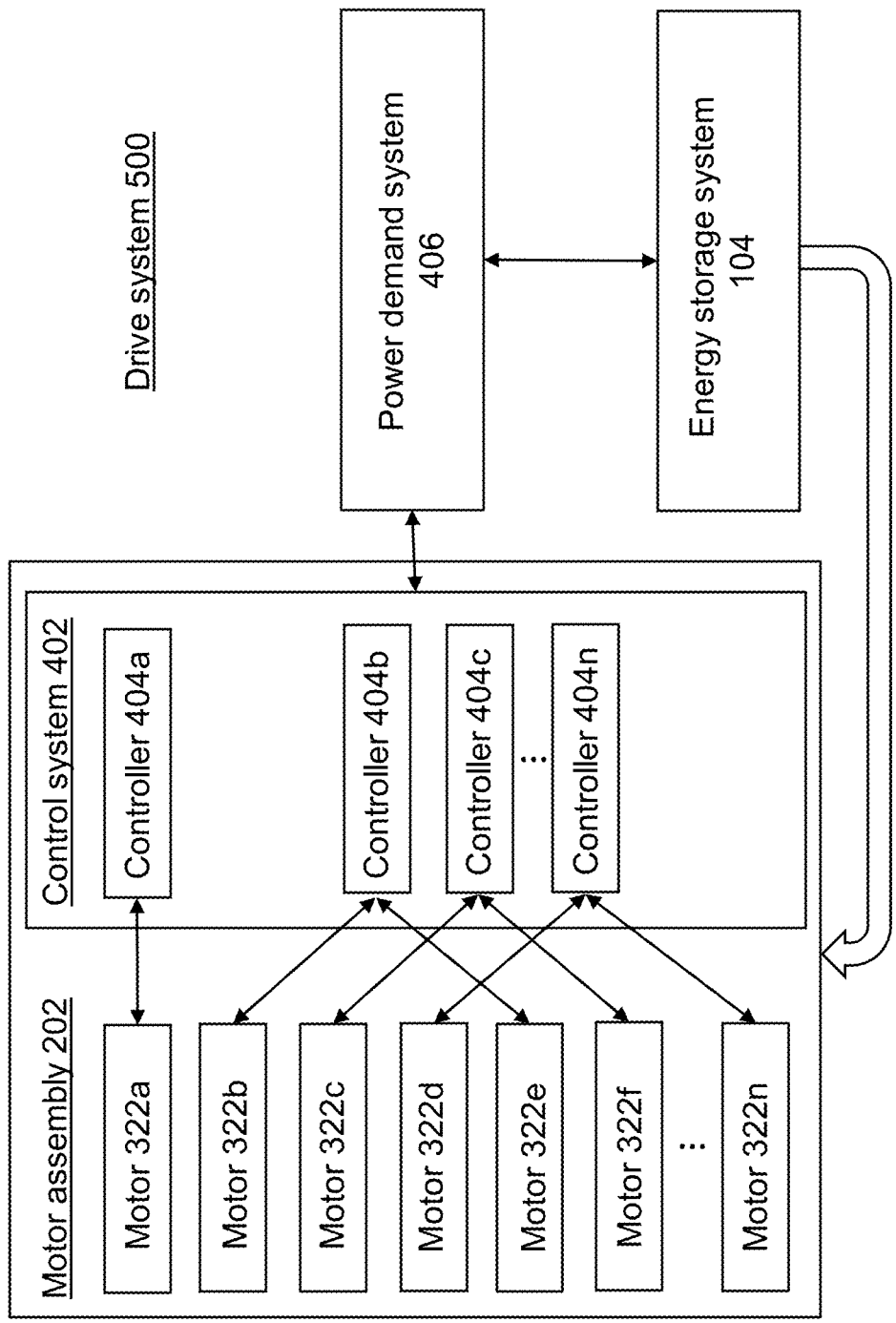
FIG. 5 shows a diagram of a drive system according to aspects of the disclosure.

FIG. 5 shows a diagram of a drive system 500 according to aspects of the disclosure. Drive system 500 can be substantially the same as drive system 400. However, drive system 500 can include a single controller 404 per pair of motors within motors 322. Like drive system 400, drive system 500 can include a single controller 404a controlling motor 322a. However, drive system 500 can include a single controller 404b controlling both of motors 322b and 322e. Drive system 500 can likewise include a single controller 404c controlling both of motors 322c and 322f. Drive system 500 can include any number of controllers 404 up to controller 404n, and, as noted above, motor assembly 202 can include any number of pairs of motors, with the final pair of motors being represented by 322*d* and 322*n*. Each of the pairs of motors can be controlled by a controller 404. In aspects, the pairs of motors controlled by controllers 404 can be two motors arranged on opposite sides of motor 322*a*, like motors 322*b* and 322*e* shown in FIG. 3B. In other aspects, the pairs of motors controlled by controllers 404 can be two motors arranged in any other configuration, such as side by side, like motors 322*b* and 322*c* shown in FIG. 3B.

The configuration of FIG. 5 can be advantageous when motors 322*b*-322*n* are controlled in pairs. For example, the configuration of FIG. 5 can reduce the number of components required while maintaining the functionality of activating or deactivating motors 322*b*-322*n* in pairs based on the torque need.

Figure 6:
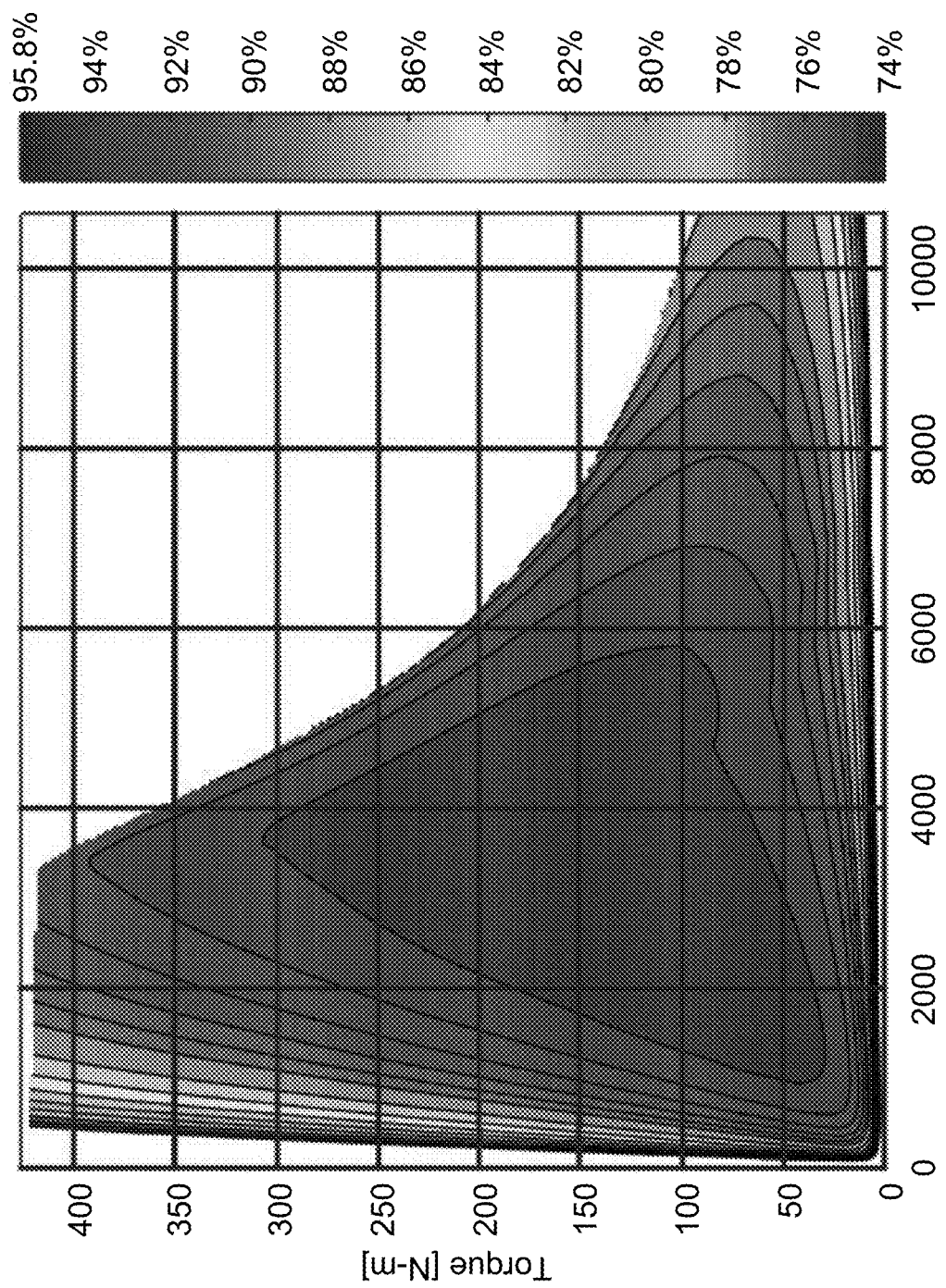
FIG. 6 shows a graph of motor efficiency as a function of output torque and RPM for an electric motor.

FIG. 6 shows a graph of motor efficiency as a function of output torque and RPM for an electric motor. Motor efficiency is defined as the percentage of electrical input power that is converted to mechanical output power.

The electric motor of FIG. 6 has a continuous power rating of about 150 kW. While the scale and shape of FIG. 6 depends on the specifications of the electric motor (e.g., continuous power rating, peak power rating, etc.), FIG. 6 illustrates the relationship between torque (Nm), speed (RPM), and efficiency for electric motors. In particular, FIG. 6 shows that efficiency decreases at lower loads (i.e., at output torques that represent a smaller percentage of the electric motor's continuous output torque for a given RPM). For example, FIG. 6 shows that at 8,000 RPM, the electric motor operates at an efficiency of about 90% when providing 50 Nm of torque. However, the electric motor operates at an efficiency of about 82% when providing 12 Nm of torque at the same RPM. Using an inverter with an efficiency of 92% at low loads to operate the electric motor therefore yields an overall efficiency of about 75% at 12 Nm of torque and 8,000 RPM. In aspects, this torque and RPM represents the approximate requirements of propelling an EV at 60 MPH on a flat road (e.g., a highway).

However, as noted above, motor assembly 202 can provide a means for dynamically adjusting the peak and continuous output torque at a given RPM. Specifically, the plurality of electric motors of motor assembly 202 can each be activated or deactivated based on a torque needed to achieve a particular RPM. For example, if FIG. 6 represents motor assembly 202 with all motors 322 operating, deactivating one or more motors 322 to reduce the continuous output torque of motor assembly 202 at a given RPM can cause the torque need to comprise a higher percentage of the continuous output torque of motor assembly 202 (i.e., of the continuous output torque of active motors 322 collectively). This can effectively compress the graph of FIG. 6 along the y-axis for motor assembly 202. Accordingly, the efficiency of motor assembly 202 can be improved when providing the torque need. As a result, the range of an EV implementing motor assembly 202 can be increased.

For example, providing 12 Nm of output torque at 8,000 RPM, motor assembly 202 can operate at an efficiency of about 92% when operating with a single motor (e.g., motor 322*a*). Using an inverter with an efficiency of 98% at medium loads to operate motor 322*a* yields an overall efficiency of about 90%. Motor 322*a* by itself can provide a continuous output torque of about 24 Nm at 8,000 RPM, and therefore 12 Nm comprises about 50% of the continuous output torque of motor assembly 202 operating in such a configuration at 8,000 RPM. This is a higher percentage of the continuous output torque of motor assembly 202 than when additional motors 322 are activated, resulting in increased efficiency. This increased efficiency is not only compared to motor assembly 202 with more motors 322 activated; it also represents an increased efficiency as compared to a single, large electric motor having similar specifications as motor assembly 322 with all motors 322 activated, such single, large electric motors being conventionally provided in electric motor assemblies.

In the first case above, an electric motor operating at about 75% overall efficiency would require a battery to provide 13.3 kW of power (not including the 12V parasitic loss and battery loss). Therefore, an 80 kWh battery could provide about 6 hours of operation. At 60 MPH, this corresponds to about 360 miles of range. Motor assembly 202 operating with only motor 322*a* activated, yielding an overall efficiency of 90%, would require a battery to provide 11.1 kW of power (not including the 12V parasitic loss and battery loss). Therefore, an 80 kWh battery could provide about 7.2 hours of operation. At 60 MPH, this corresponds to about 435 miles of range, a 20% improvement. Alternatively, a 20% smaller battery would be needed to travel the same range.

While the example of all but motor 322*a* of motor assembly 202 being deactivated is provided, it should be understood that similar increases in efficiency can be achieved by activating whatever number of motors 322 corresponds to a maximally efficient configuration for a given torque and RPM output. That is, control system 402 can activate the number of motors 322 that, at the RPM output, causes the output torque to comprise a percentage of the continuous output torque of the active number of motors 322 that corresponds to a maximum possible operating efficiency for motor assembly 202.

FIG. 7 shows a diagram of a method 700 according to aspects of the disclosure. In aspects, the electric drive unit of method 700 can be first or second drive unit 102*a* or 102*b*. The method 700 can include step 702.

Step 702 can include installing an electric motor assembly in an electric drive unit, the electric motor assembly including: a housing including a plurality of cavities; a gear assembly, the gear assembly including: an output gear coupled to an output shaft, and adjacent gears coupled to the output gear; the electric motor assembly further including: a plurality of electric motors at least partially within the plurality of cavities, the plurality of electric motors including: a first electric motor coupled to the output gear, and adjacent electric motors coupled to the adjacent gears; the electric motor assembly further including: a controller to activate and deactivate one or a pair of motors of the plurality of electric motors. In aspects, the housing can be main housing 302. In aspects, the plurality of cavities can be cavities 324*a*-324*g*. In aspects, the gear assembly can be gear assembly 316. In aspects, the adjacent gears can be gears 318*b*-318*g*. In aspects, the output gear can be gear 318*a*. The adjacent gears can be either directly or indirectly coupled to gear 318*a*, as described with respect to FIG. 3B. In aspects, the plurality of electric motors can be motors 322. In aspects, the adjacent electric motors can be motors 322*b*-322*g*. In aspects, the first electric motor can be motor 322*a*. In aspects, the controller can be any one of controllers 404.

In aspects, the electric drive unit of step 702 can be installed on a vehicle. In aspects, the vehicle can be an electric vehicle. In aspects, the vehicle can be vehicle 100.

In aspects, the plurality of cavities of method 700 can include peripheral cavities arranged around a central cavity. In aspects, the peripheral cavities can be cavities 324*b*-324*g* and the central cavity can be cavity 324*a*. In aspects, the adjacent electric motors of method 700 can be an even number of electric motors. In aspects, the electric motor assembly of method 700 can further include a cooling feature configured to simultaneously cool at least one motor of the plurality of electric motors and a printed circuit board (PCB) connected to the at least one motor. In aspects, the cooling feature can be one or more of cooling channels 330 and the PCB can be first PCB 326 and/or second PCB 328. In aspects, method 700 can further include selecting a number of electric motors to be included in the plurality of cavities based on a use environment.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The term "about" or "substantially" or "approximately" as used herein means the value of a given quantity that can vary based on a particular technology. Based on the particular technology, the term "about" or "substantially" or "approximately" can indicate a value of a given quantity that varies within, for example, 0.1-10% of the value (e.g., ±0.1%, ±1%, ±2%, ±5%, or ±10% of the value).

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. An electric motor assembly, comprising:
   a housing comprising a plurality of cavities;
   a gear assembly, comprising:
   an output gear coupled to a rotatable output shaft configured to transfer a torque to an external gear assembly, and
   adjacent gears coupled to the output gear;
   a plurality of electric motors at least partially within the plurality of cavities, the plurality of electric motors comprising:
   a first electric motor coupled to the output gear, and
   adjacent electric motors coupled to the adjacent gears; and
   a controller to activate and deactivate one or a pair of motors of the plurality of electric motors.

2. The electric motor assembly of claim 1, wherein the plurality of cavities comprises peripheral cavities arranged around a central cavity.

3. The electric motor assembly of claim 2, wherein the adjacent electric motors comprise an even number of electric motors.

4. The electric motor assembly of claim 1, wherein upon failure of a portion of the plurality of electric motors, operability of the electric motor assembly is maintained.

5. The electric motor assembly of claim 1, further comprising a cooling feature configured to simultaneously cool at least one motor of the plurality of electric motors and a printed circuit board (PCB) connected to the at least one motor.

6. An electric drive system, comprising:
   an electric motor assembly, comprising:
   a gear assembly comprising an output gear and one or more gears coupled to the output gear, the output gear being coupled to an output shaft, and
   a plurality of electric motors, each of the plurality of electric motors coupled to a gear of the gear assembly;
   a control system to activate and deactivate one or more motors of the plurality of electric motors;
   an energy storage system coupled to the electric motor assembly; and
   a power demand system to communicate a torque need to the control system to activate or deactivate the one or more motors,
   wherein the control system is configured to activate and deactivate the one or more motors based on the torque need such that a number of simultaneously activated motors of the plurality of electric motors depends on the torque need.

7. The electric drive system of claim 6, wherein the electric motor assembly further comprises a housing comprising a plurality of cavities.

8. The electric drive system of claim 7, wherein the plurality of electric motors is at least partially within the plurality of cavities.

9. The electric drive system of claim 7, wherein the plurality of cavities comprises peripheral cavities arranged around a central cavity.

10. The electric drive system of claim 6, wherein the plurality of electric motors comprises:
    a first electric motor coupled to the output gear, and
    one or more adjacent electric motors coupled to the one or more gears.

11. The electric drive system of claim 10, wherein the one or more adjacent electric motors comprise an even number of electric motors.

12. The electric drive system of claim 6, wherein the number of simultaneously activated motors of the plurality of electric motors is a maximally efficient number of motors, given the torque need.

13. A method, comprising:
  installing an electric motor assembly in an electric drive unit, the electric motor assembly comprising:
    a housing comprising a plurality of cavities;
    a gear assembly, comprising:
      an output gear coupled to a rotatable output shaft configured to transfer a torque to an external component, and
      adjacent gears coupled to the output gear;
    a plurality of electric motors at least partially within the plurality of cavities, the plurality of electric motors comprising:
      a first electric motor coupled to the output gear, and
      adjacent electric motors coupled to the adjacent gears; and
    a controller to activate and deactivate one or a pair of motors of the plurality of electric motors.

14. The method of claim 13, wherein the plurality of cavities comprises peripheral cavities arranged around a central cavity.

15. The method of claim 13, wherein the adjacent electric motors comprise an even number of electric motors.

16. The method of claim 13, wherein the electric motor assembly further comprising a cooling feature configured to simultaneously cool at least one motor of the plurality of electric motors and a printed circuit board (PCB) connected to the at least one motor.

17. The method of claim 13, further comprising selecting a number of electric motors to be included in the plurality of cavities based on a use environment.

18. The method of claim 13, wherein the electric drive unit is installed on a vehicle.

19. The method of claim 18, wherein the vehicle is an electric vehicle.

20. A vehicle comprising:
  an electric motor assembly, wherein the electric motor assembly comprises:
    a housing comprising a plurality of cavities;
    a gear assembly, comprising:
      an output gear coupled to an output shaft, and
      adjacent gears coupled to the output gear;
    a plurality of electric motors at least partially within the plurality of cavities, the plurality of electric motors comprising:
      a first electric motor coupled to the output gear via the output shaft, and
      adjacent electric motors coupled to the adjacent gears; and
    a controller to activate and deactivate one or a pair of motors of the plurality of electric motors.

* * * * *